United States Patent [19]

Beny et al.

[11] Patent Number: 4,732,049

[45] Date of Patent: Mar. 22, 1988

[54] REMOVABLE TOY MOTOR MODULE

[75] Inventors: Janos Beny, Vista; Keith Meggs, Torrance; Miva Filoseta, Los Angeles; Edwin Faris, Simi Valley, all of Calif.

[73] Assignee: Mattel, Inc., Hawthorne, Calif.

[21] Appl. No.: 872,361

[22] Filed: Jun. 9, 1986

[51] Int. Cl.[4] .................................................. F16H 1/12
[52] U.S. Cl. ..................................... 74/421 A; 446/156
[58] Field of Search ................. 74/421 R, 421 A, 406, 74/333, 640; 310/1, 83, 92; 81/57.14, 473, 475, 474; 446/156, 163, 90, 158, 457, 358

[56] References Cited

U.S. PATENT DOCUMENTS

| | | | |
|---|---|---|---|
| 918,773 | 4/1909 | Schatz | 74/333 |
| 968,718 | 8/1910 | Wahlstrom | 74/421 R |
| 1,864,844 | 6/1932 | Meunier | 74/421 R |
| 2,028,441 | 1/1936 | Decker | 81/474 X |
| 2,922,250 | 1/1960 | Agala | |
| 3,110,381 | 11/1963 | Leu | 74/421 A X |
| 3,190,031 | 6/1965 | Tengetitsch | |
| 3,241,397 | 3/1966 | Wilkinson | 74/421 A X |
| 3,418,751 | 12/1968 | Mabuchi | |
| 3,450,908 | 6/1969 | Mabuchi | 446/163 X |
| 3,464,154 | 9/1969 | Di Leua | |
| 3,491,479 | 1/1970 | Carter | |
| 3,570,179 | 3/1971 | Yamakawa | |
| 3,638,353 | 1/1972 | Frye et al. | |
| 3,785,084 | 1/1974 | Aenishanslin | |
| 3,808,734 | 5/1974 | Suzuki | |
| 3,859,749 | 1/1975 | Menn et al. | |
| 3,935,665 | 2/1976 | Tong | |
| 4,135,326 | 1/1979 | Tong | |
| 4,236,343 | 12/1980 | Wildman | |
| 4,244,136 | 1/1981 | Kuldan | |
| 4,478,101 | 10/1984 | Rumsa | 74/421 R X |
| 4,619,162 | 10/1986 | Van Laere | 74/421 A X |

FOREIGN PATENT DOCUMENTS 1219791   1/1971   United Kingdom ................ 446/156

*Primary Examiner*—Kenneth J. Dorner
*Assistant Examiner*—James R. Brittain
*Attorney, Agent, or Firm*—Ronald M. Goldman; Melvin A. Klein; Daniel F. Sullivan

[57] ABSTRACT

A removable toy motor module which can be used with a variety of figure toys and toy accessories. The motor module uses a battery powered motor which drives an output gear extending from a motor housing. The output gear can be used to drive a variety of accessories and the motor module can be easily attached to the harness of a figure toy. A battery cover may be rotated with respect to the housing for the purpose of turning the motor on and off. Gears located in the housing engage the motor to the output gear. A clutch ratchet and gear-clutch drum are designed to disengage if the torsion transmitted to the output gear exceeds a predetermined value, providing a built-in safety feature. A compression spring is used to minimize damage to the output gear in case the motor module is dropped. An O-ring disposed around the output gear provides a seal allowing the motor module to be used in water.

6 Claims, 10 Drawing Figures

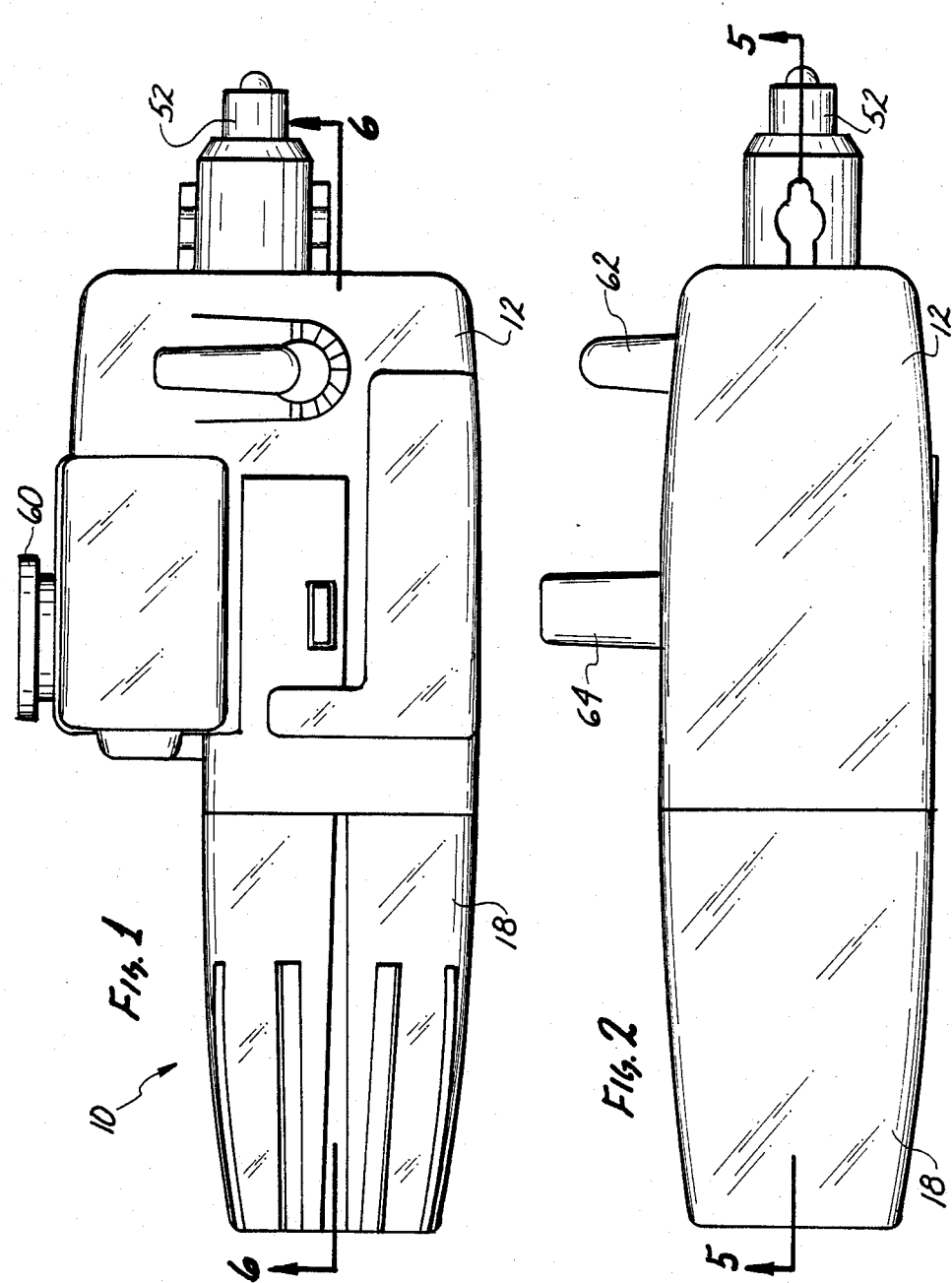

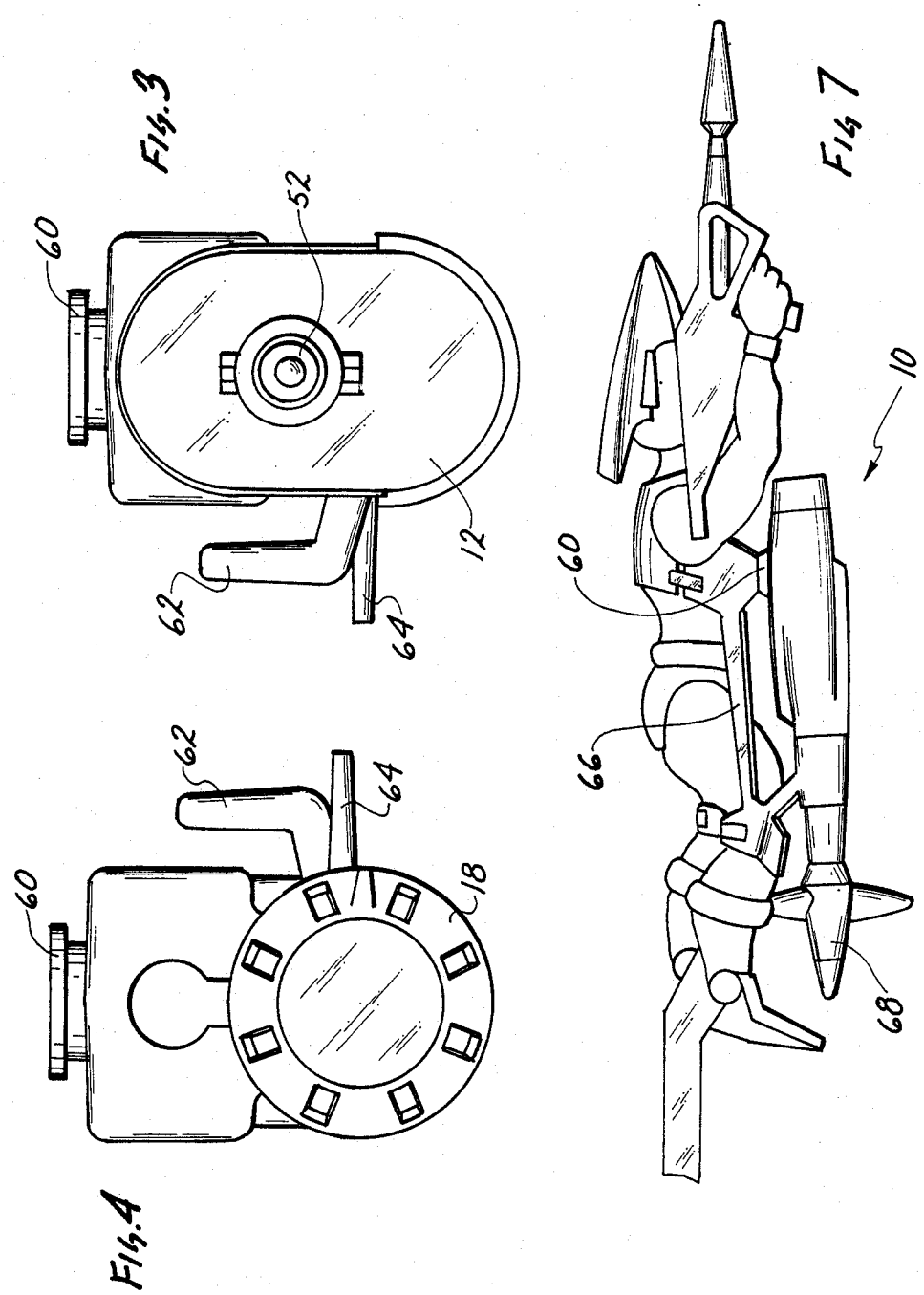

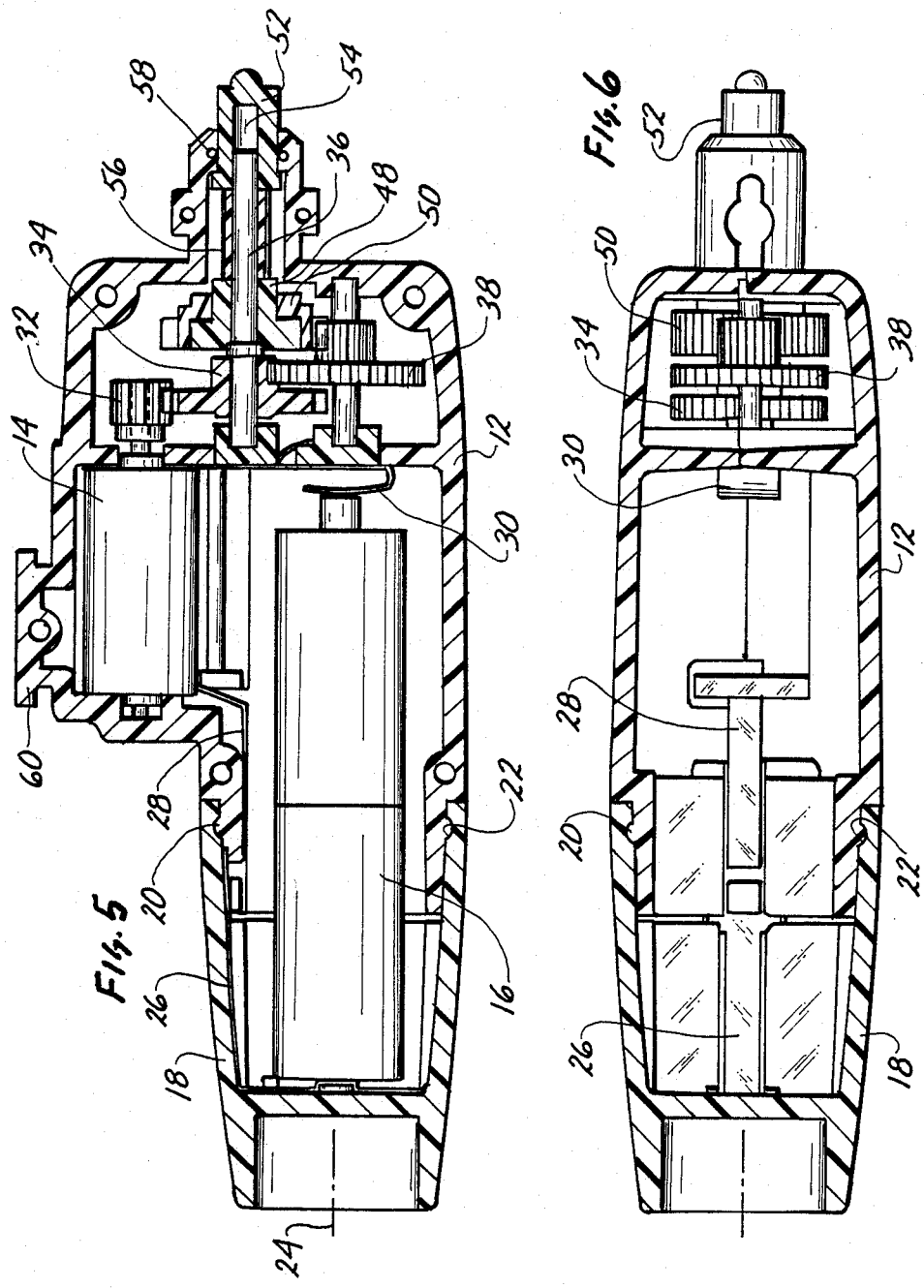

REMOVABLE TOY MOTOR MODULE

BACKGROUND OF THE INVENTION

The present invention relates generally to toy motors and, more particularly, to a removable toy motor module which can be used with a variety of figure toys and toy accessories.

In the past, various toy tools have been provided for children such as those disclosed in U.S. Pat. Nos. 4,236,343 issued to Weldman on Dec. 2, 1980 (Toy Power Tool); 3,859,749 issued to Morin et al on Jan. 14, 1975 (Toy Power Tool); 3,491,479 issued to Carter on Jan. 27, 1970 (Toy Chain Saw); 3,190,031 issued to Tengelitsch on June 22, 1965 (Toy Chain Saw); and 2,922,250 issued to Ayala on Jan. 26, 1960 (Toy Pneumatic Hammer). However, all of these toys have built-in motor or spring units. Aquatic or swimming toys with self-contained motors are described in U.S. Pat. Nos. 4,135,326 issued to Tong on Jan. 23, 1979 (Aquatic Figure Toy); 3,935,665 issued to Tong on Feb. 3, 1976 (Submersible Toy); 3,808,734 issued to Suzuki on May 7, 1974 (Toy Dolphin); 3,785,084 issued to Aenishanslin on Jan. 15, 1974 (Self-Propelled Aquatic Toy); 3,638,353 issued to Fryc et al on Feb. 1, 1972 (Aquatic Toy Propulsion Assembly); 3,570,179 issued to Yamakawa on Mar. 16, 1971 (Swimming Toy Assembly); and 3,464,154 issued to Leva on Sept. 2, 1969 (Swimming Figurine). Finally, a suspending and propelling means for use with toy figures is disclosed in U.S. Pat. No. 4,244,136 issued to Kublan on Jan. 13, 1981.

None of the above patents discloses a motor unit which may be conveniently used by a child during play with a variety of different figure toys and toy accessories. Such a motor unit would be particularly advantageous if it is capable of being used in conjunction with one toy and then removed and reused with another toy. Accordingly, there is a need in the toy manufacturing arts for a removable toy motor module which may be used with a variety of toys and accessories.

SUMMARY OF THE INVENTION

It is an object of this invention to provide an improved removable toy motor module.

It is another object of this invention to provide a removable toy motor module which may be used in conjunction with a variety of different figure toys and toy accessories.

It is still another object of this invention to provide a removable toy motor module which may be used to propel aquatic or swimming toys.

It is still another object of this invention to provide a removable toy motor module which may be releasably attached to the harness of a figure toy.

It is still another object of this invention to provide a removable toy motor module with a built-in clutch means which functions as a safety device.

It is still another object of this invention to provide a removable toy motor module with a built-in spring means which minimizes possible damage to the output gear of the module.

These and other objects and advantages are attained by a removable toy motor module which can be used with a variety of figure toys and toy accessories. The motor module uses a battery powered motor which drives an output gear extending from a motor housing. The output gear can be used to drive a variety of accessories and the motor module can be easily attached to the harness of a figure toy. A battery cover may be rotated with respect to the housing for the purpose of turning the motor on and off. Gears located in the housing engage the motor to the output gear. A clutch ratchet and gear-clutch drum are disigned to disengage if the torsion transmitted to the output gear exceeds a predetermined value, providing a built-in safety feature. A compression spring is used to minimize damage to the output gear in case the motor module is dropped. An O-ring disposed around the output gear provides a seal allowing the motor module to be used in water.

The various features of the present invention will be best understood, together with further objects and advantages by reference to the following description of the preferred embodiment, taken in conjunction with the accompanying drawings.

BRIEF DESCRIPTION OF THE DRAWINGS

FIG. 1 is a side elevational view of a removable toy motor module made in accordance with the concepts of the present invention;

FIG. 2 is a bottom plan view of the motor module of FIG. 1;

FIG. 3 is an end elevational view of the motor module of FIG. 1 taken where an output gear exits the module;

FIG. 4 is an end elevational view of the motor module of FIG. 1 taken at the opposite end of the module;

FIG. 5 is a partial longitudinal cross-sectional view of the motor module of FIG. 1 taken in the direction of arrows 5—5 shown in FIG. 2;

FIG. 6 is a partial longitudinal cross-sectional view of the motor module of FIG. 1 taken in the direction of arrows 6—6 shown in FIG. 1;

FIG. 7 is a perspective view showing how the motor module of FIG. 1 may be connected to the harness of a figure toy and coupled to propeller blades mounted on the harness;

DESCRIPTION OF THE PREFERRED EMBODIMENT

Figure 8:
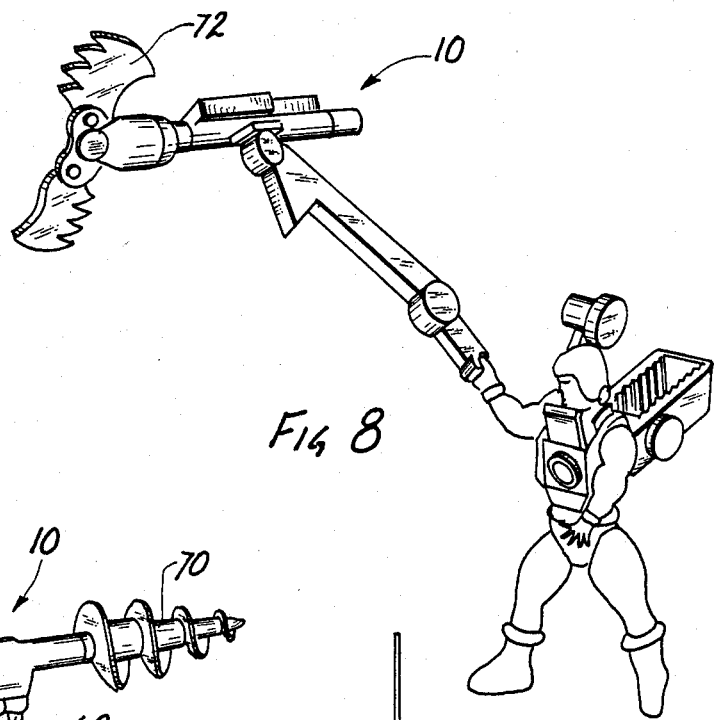
FIG. 8 is a perspective view showing how the motor module of FIG. 1 may be supported on a toy accessory and used in conjunction with rotating blades coupled to the output gear of the module.

The following specification taken in conjunction with the drawings sets forth the preferred embodiment of the present invention in such a manner that any person skilled in the toy manufacturing arts can use the invention. The embodiment of the invention disclosed herein is the best mode contemplated by the inventors for carrying out their invention in a commercial environment, although it should be understood that various modifications can be accomplished within the parameters of the present invention.

Referring now to the drawings and particularly to FIGS. 1 through 5, a preferred embodiment of the removable toy motor module 10 is disclosed. The motor module 10 has a housing 12. A motor 14 is mounted within the housing 12 as shown in FIG. 5. A battery cover 18 is rotatably coupled to the housing 12. The motor 14 is powered by a battery 16 located within the housing 12 and the battery cover 18. The cover 18 is preferably coupled to the housing 12 by a circumferential bead 20 on the housing which releasably engages a circumferential groove 22 in the cover as the cover and housing are pushed together. After the two parts are coupled together, the cover 18 and housing 12 are free to rotate with respect to each other about longitudinal axis 24.

Since the cover 18 and housing 12 are free to rotate, contact 26 attached to the cover may be moved until it touches contact 28 attached to the housing. Contact 30 also attached to the housing 12 is used to complete a circuit for the motor 14.

As best shown in FIG. 5, motor 14 drives pinion gear 32 which in turn engages spur gear cluster 34 rotatably coupled to gear shaft 36 rotatably mounted inside the housing 12. Spur gear cluster 34, in turn, drives spur gear cluster 38 rotatably mounted in the housing 12. A clutch ratchet 48 is attached to shaft 36. The clutch ratchet 48 operably engages a gear-clutch drum 50 as shown in FIG. 5. The gear clutch drum 50 is driven by spur gear cluster 38.

One end of shaft 36 is rotatably mounted to the housing 12 while the other end slidably engages aperture 54 in output gear 52. The end of the shaft 36 which slidably engages aperture 54 preferably has a square cross-section. However, any type of cross-section may be used. The inside surface of aperture 54 is suitably formed to slidably engage the end of shaft 36 and to transfer torsion from the shaft to the output gear 52. A compression spring 56 is disposed about shaft 36 and between the output gear 52 and the clutch ratchet 48. Since the output gear 52 is free to slide on shaft 56, the compression spring 56 allows gear 52 to move in the direction of the longitudinal axis of the shaft against the force of the spring in order to help prevent damage such as when the motor module is dropped and the gear 52 is struck against a surface.

An O-ring 58 (see FIG. 5) is positioned between output gear 52 and the housing 12. The O-ring 58 provides a seal in case the motor module 10 is used in conjunction with a toy in water (see FIG. 7).

Figure 9:
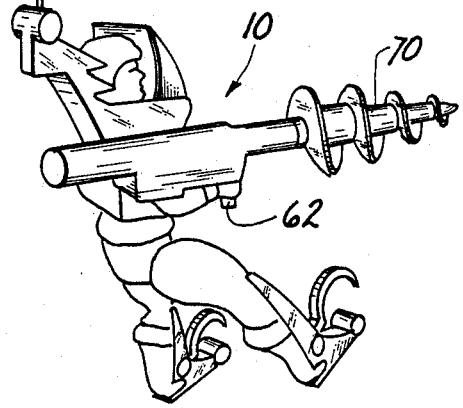
FIG. 9 is a perspective view showing how the motor module of FIG. 1 may be used in conjunction with a figure toy and a rotating drill accessory coupled to the output gear of the module.

The motor module 10 has an upward extension 60 which may be used to releasably connect the module to the harness 66 of a figure toy as shown in FIG. 7. When used in this way, the module 10 is connected to the harness 66 and the output gear 52 is coupled to propeller blades 68 allowing the figure toy to be propelled through water. In addition, side extensions 62 and 64 also allow the module 10 to be used in conjunction with a figure toy. For example, side extension 62 may be used as a handle which can be gripped by the figure toy as shown in FIG. 9. Side extension 64 may also be used, for example, to clamp, support or attach an accessory to the motor module 10. Note how a drill accessory 70 may be coupled to the output gear 52 (see FIG. 9). As such, a child may turn cover 18 during play until contacts 26 and 28 touch causing output gear 52 to rotate the drill 70.

Figure 10:
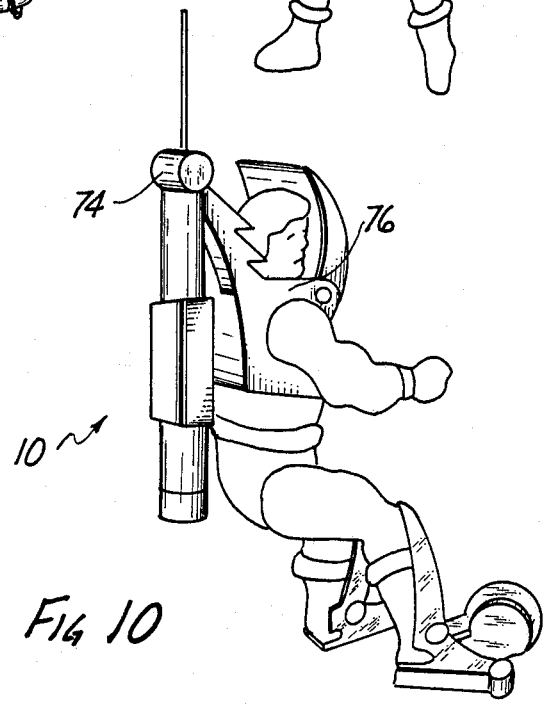
FIG. 10 is a perspective view showing how the motor module of FIG. 1 may be coupled to a rotating winch mounted on the harness of a figure toy.

FIGS. 8 and 10 illustrate other uses of the motor module 10. As shown, output gear 52 may be coupled to rotating blades 72 or to a winch 74 attached to the harness 76 of a figure toy. Numerous other uses may be made of the motor module 10. A child may simply uncouple the motor module 10 from a harness or toy accessory and recouple the module to a different toy. As such, the motor module 10 functions as a multipurpose removable power unit.

The clutch ratchet 48 and gear-clutch drum 50 provide a desirable safety feature. The ratcher 48 and drum 50 are designed so that these parts will disengage if the torsion transmitted to the output gear 52 exceeds a predetermined value. For example, if the output gear 52 is held while the motor 14 is running, then the drum 50 will disengage from the ratchet 48 preventing damage to the other gears.

The above description discloses the preferred embodiment of the present invention. However, persons of ordinary skill in the toy field are capable of numerous modifications once taught these principles. Accordingly, it will be understood by those skilled in the art that changes in form and details may be made to the above-described embodiment without departing from the spirit and scope of the invention.

We claim:

1. A removable toy motor module for use with a figure toy and toy accessories, comprising:
   a hollow housing;
   a cover removably engaged to said housing;
   an output gear extending through an aperture in said housing;
   a shaft rotatably mounted within said housing and slidably engaged to said output gear;
   motor means located within said housing for driving said output gear;
   seal means disposed about said output gear for providing a seal between said output gear and said housing;
   gear means located within said housing for operably engaging said output gear to said motor means; and
   spring means disposed around said shaft for biasing said output gear generally in a direction along the longitudinal axis of said shaft away from said gear means and through said aperture in said housing, said gear means including:
   (a) a pinion gear attached to said motor;
   (b) a first spur gear cluster rotatably coupled to said shaft, said first spur gear cluster engaging said pinion gear;
   (c) a second spur gear cluster rotatably mounted within said housing, said second spur gear cluster engaging said first spur gear cluster;
   (d) a gear clutch drum disposed around said shaft, said gear clutch drum engaging said second gear spur cluster; and
   (e) a clutch ratchet attached to said shaft, said clutch ratchet operably engaging said gear clutch drum.

2. A removable toy motor module for use with a figure toy and toy accessories, comprising:
   a hollow housing;
   a cover rotatably engaged to said housing;
   an output gear extending through an aperture in said housing;
   a shaft rotatably mounted within said housing and slidably engaged to said output gear;
   motor means located within said housing for driving said output gear;
   gear means located within said housing for operably engaging said output gear to said motor means;
   clutch means disposed about said shaft for engaging said gear means to said output gear and disengaging said gear means from said output gear, said clutch means including (a) a gear clutch drum disposed around said shaft, said gear clutch drum engaging said gear means, and (b) a clutch ratchet attached to said shaft, said clutch ratchet operably engaging said gear clutch drum; and spring means disposed around said shaft for biasing said output gear through said aperture in said housing.

3. The motor module of claim 2 further comprising seal means for providing a seal between said output gear and said housing.

4. The motor module of claim 3 wherein said gear means comprises:

a pinion gear attached to said motor;

a first spur gear cluster rotatably coupled to said shaft, said first spur gear cluster engaging said pinion gear; and a second spur gear cluster rotatably mounted within said housing, said second spur gear cluster engaging said first spur gear cluster.

5. The motor module of claim 7 further comprising at least one extension from said housing.

6. A removable toy motor module for use with a figure toy and toy accessories, comprising:

a hollow housing having at least one extension therefrom;

a generally cylindrically-shaped hollow cover romovably and rotatably engaged to said housing;

an output gear extending through an aperture in said housing, said output gear rotatably engaging said aperture;

a shaft rotatably mounted within said housing, one end of said shaft rotatably engaging said housing and the other end of said shaft slidably engaging said output gear;

motor means located within said housing for driving said output gear;

a pinion gear attached to said motor;

a first spur cluster rotatably coupled to said shaft, said first spur cluster engaging said pinion gear;

a second spur gear cluster rotatably mounted within said housing, said second spur gear cluster engaging said first spur gear cluster;

a gear clutch drum disposed around said shaft, said gear clutch drum engaging said second gear spur cluster;

a clutch ratchet attached to said shaft, said clutch ratchet operably engaging said gear clutch drum;

spring means disposed around said shaft and between said output gear and said clutch ratchet for biasing said output gear generally in a direction along the longitudinal axis of said shaft away from said clutch ratchet and through said aperture in said housing; and seal means disposed around said output gear for providing a seal between said output gear and said housing.

* * * * *